Oct. 13, 1970  R. F. WILLIAMS  3,533,649
PIPE FITTING
Filed Jan. 30, 1969
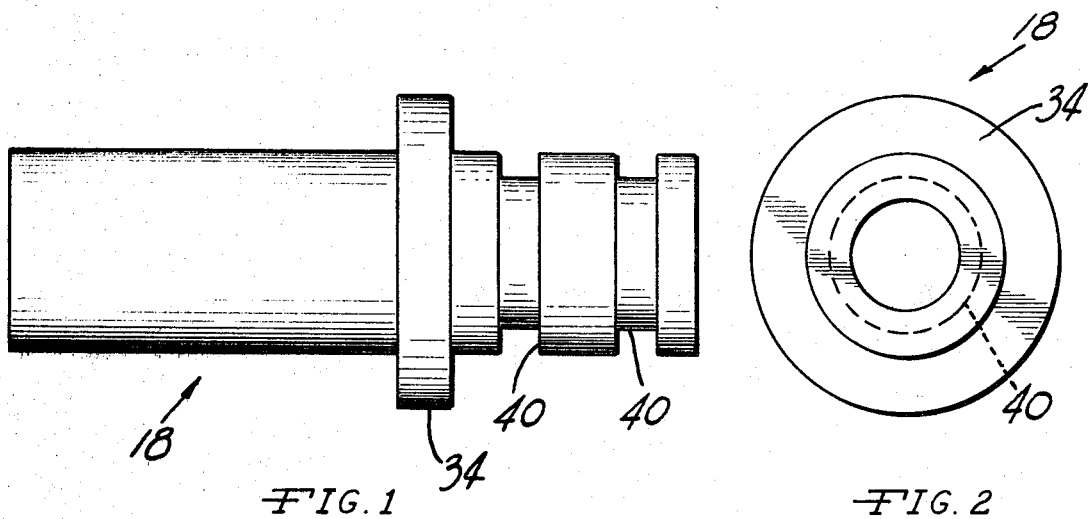
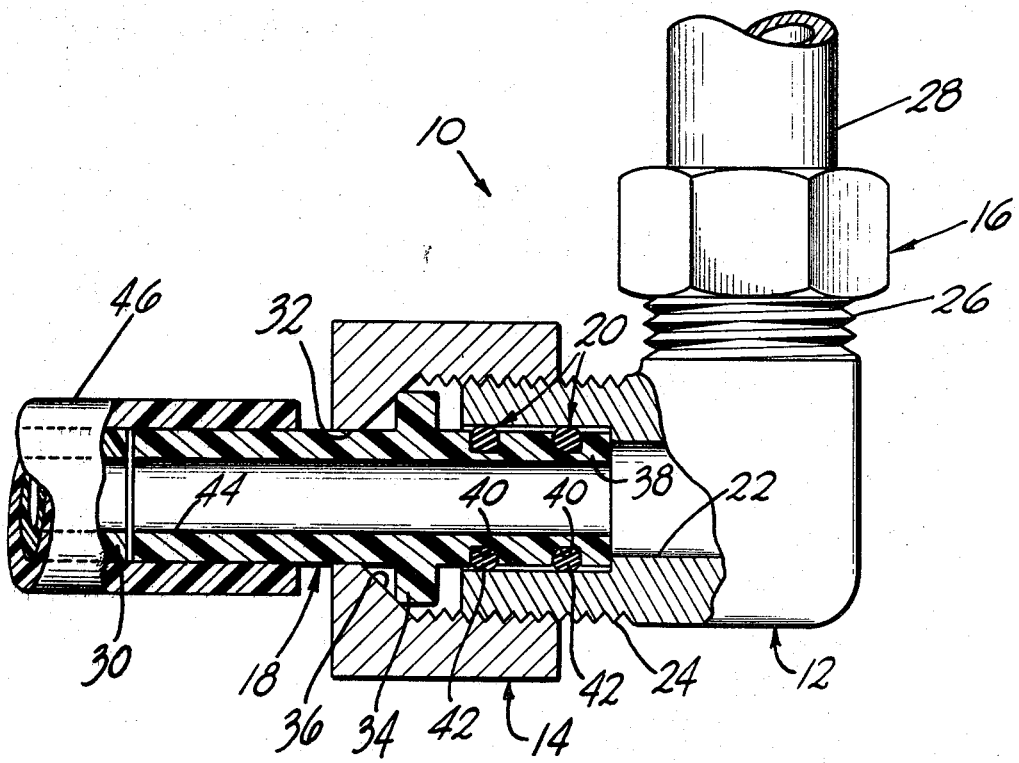
INVENTOR
ROBERT F. WILLIAMS
BY
*Olsen and Stephenson*
ATTORNEYS

United States Patent Office 3,533,649
Patented Oct. 13, 1970

3,533,649
PIPE FITTING
Robert F. Williams, Davison, Mich., assignor to Genova Products, Davison, Mich., a corporation of Michigan
Filed Jan. 30, 1969, Ser. No. 795,222
Int. Cl. F16l 55/00
U.S. Cl. 285—174                              6 Claims

ABSTRACT OF THE DISCLOSURE

A transition fitting for use in hot and cold water piping systems having metal and organic plastic piping. The transition fitting has a unit which allows for expansion and contraction without leaks occurring.

BACKGROUND OF THE INVENTION

The present invention relates to a transition fitting for connecting piping made of materials having different coefficient of expansion.

In certain organic plastic water pipe distribution systems there are areas where a transition must be made from plastic piping to conventional metal piping. Certain difficulties are encountered in these areas primarily due to expansion and contraction which occurs because of the differences of coefficients of expansion of the materials of which the piping is made. If a plastic threaded fitting is inserted into a corresponding metal threaded fitting, the differences in coefficient of expansion of the two materials can causes a looseness of thread contact which may and usually does result in a leak.

An alternate arrangement for joining fittings to piping is by means of compression fittings, and the same problems arise when such connections are made. When using a compression fitting, a plastic ferrule is used where the plastic pipe is connected in place of the conventional brass ferrule used with compression fittings of metal piping. Expansion and heat sometimes causes the seal of the ferrule to loosen and a leak results. In some instances, extreme water pressure and/or water hammer can push the ferrule off the pipe with catastrophic results.

SUMMARY OF THE INVENTION

The present invention has provided a new transition fitting which has supplied an answer to these problems. The transition fitting is constructed and arranged so that its sealing properties are not materially altered by virtue of differences in expansion and contraction of the plastic and metal parts, and also so that leaks will not occur resulting from pressure conditions within the system.

According to a preferred form of the present invention, a transition fitting is provided for connecting piping made of materials having different coefficients of expansion comprising a body member of one material having a passageway therethrough, means at one end of the body member for connecting the body member to piping of said one material, a compression nut threadedly connected to the other end of said body member, a tubular member of said other material extending through said compression nut into said passageway, said tubular member having an integral annular rib projecting radially outwardly for engagement by said nut for urging one end portion of the tubular member into said passageway, the other end portion of the tubular member projecting beyond said nut for connection to said piping made of said other material, said one end portion having at least one annular groove in its outer surface, and an O-ring seated in said groove and in engagement with said passageway providing a seal between said tubular member and said body member.

Normally the material of the body member and the piping connected to said one end will be a conventional metal, and the material of the tubular member and the piping connected to it will be an organic plastic material such as chlorinated polyvinyl chloride.

Thus, it is an object of the present invention to provide an improved transition fitting for joining piping made of different materials.

Other objects of this invention will appear in the following description and appended claims, reference being had to the accompanying drawings forming a part of this specification wherein like reference characters designate corresponding parts in the several views.

BRIEF DESCRIPTION OF THE DRAWING

FIG. 1 is a side elevational view of a tubular member forming one component of the transition fitting embodying the present invention;

FIG. 2 is an end elevation of the tubular member illustrated in FIG. 1; and

FIG. 3 is a side elevational view, partly in section, illustrating a transition fitting embodying the present invention.

DESCRIPTION OF THE PREFERRED EMBODIMENT

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The transition fitting 10 is shown as an elbow, but it will be readily understood that it may be in the form of any conventional pipe fitting for joining two sections of piping or any two segments of a plumbing system together. In the illustrated embodiment of the invention, the transition fitting 10 includes a body member 12, compression nuts 14 and 16, tubular member 18 and a plurality of O-rings 20.

The body member 12 is a conventional plumbing fitting made of metal and has a passageway 22 therethrough and is threaded at its opposite ends, as at 24 and 26, for threadedly receiving the compression nuts 14 and 16. The one end of the body member 12 on which the compression nut 16 is threadedly connected is adapted to be connected to a conventional metal piping 28, and it will be understood that a conventional metal ferrule, not shown, is located between the compression nut 16 and the piping 28 to effect a tight seal. In view of the fact that there will be no material difference in the coefficient of expansion between the body member 12 and the piping 28, the sealing means provided by the compression nut 16 will effectively seal the joint between such piping 28 and the body member 12.

The problems that exist in the prior art when joining a body member 12 to a plastic pipe 30 normally occur at the other end of the body member 12 on which the compression nut 14 is threadedly connected. As previously indicated, the problem arises because of the difference in the coefficient of expansion of the plastic pipe 30 and the compression nut 14 and body member 12.

To overcome these problems, a tubular member 18 has been provided of the same material as the piping 30 which extends through the opening 32 in the compression nut 14 and into the passageway 22. The tubular member which can be made in any suitable way, such as by molding, is provided with an integral annular rib 34 which projects radially outwardly for engagement by the beveled annular surface 36 of the clamping nut 14 for urging the one end portion 38 of the tubular member 18 into the passageway 22 and thereafter for securing the tubular member in place so that it cannot be pulled out of the body member 12 as a result of water hammer or other pressure conditions in the system. The one end portion 38 of the tubular member 18 also has a plurality of annular grooves 40 formed therein in which are seated conventional O-rings 42 for providing an effective seal between the tubular member 18 and the body member 12. Thus, when installing the tubular member 18 in place in the body member 12, the compression nut 14, when turned, will act to urge the tubular member 18 axially inward, and the O-rings will then be placed in a state of compression when engaging the body member 12, assuring the desired seal, and the tubular member will be held in place and will not be permitted to be removed until the compression nut 14 has been threadedly disconnected.

As previously indicated, the other end portion 44 of the tubular member 18 projects axially away from the compression nut 14 and can be solvent welded directly into a fitting or coupling 46 to which a conventional plastic pipe can also be solvent welded.

From the foregoing description it will be understood that the present invention has now overcome the problems which heretofore existed when attempting to use plastic piping, such as chlorinated polyvinyl chloride, in a water distribution system which included piping and plumbing fixtures made of metal materials.

It is claimed:

1. A transition fitting for connecting piping made of materials having different coefficients of expansion comprising a body member of one material having a passageway therethrough, means at one end of said body member for connecting the body member to piping of said one material, said passageway having a radially inwardly directed shoulder adjacent to the other end of the body member, a compression nut threadedly connected to the other end of said body member and having an inner annular surface, tubular member of said other material extending through said compression nut into said passageway into abutment with said shoulder, said tubular member having a bore therethrough of constant internal diameter and an integral annular rib projecting radially outwardly for engagement by said annular surface of said nut for urging one end portion of the tubular member into said passageway, the outer diameter of said annular rib being greater than the transverse dimension of said passageway to preclude entry of said annular rib into said passageway and so that said rib is confined longitudinally between said body member and said annular surface, said rib being spaced longitudinally from said body member when the tubular member is in abutment with said shoulder, the other end portion of the tubular member projecting beyond said nut for connection to piping made of said other material, said one end portion having at least one annular groove in its outer surface, and an O-ring seated in said groove and in engagement with said passageway providing a seal between said tubular member and said body member.

2. A transition fitting as defined by claim 1, wherein said one end portion has a plurality of spaced grooves in its outer surface, and an O-ring is seated in each of said grooves.

3. A transition fitting as defined by claim 1, wherein said one material of the body member is a metal, and said other material of the tubular member is an organic plastic.

4. A transition fitting as defined by claim 3, wherein said organic plastic material is chlorinated polyvinyl chloride.

5. A transition fitting as defined by claim 3, wherein said tubular member is an integral molded unit.

6. A transition fitting as defined by claim 1, wherein said means comprises a compression nut fitting.

References Cited

UNITED STATES PATENTS

| 1,307,540 | 6/1919 | Dohner | 285—354 X |
| 3,236,543 | 2/1966 | Mueller | 285—174 X |
| 3,394,954 | 7/1968 | Sarns | 285—351 X |
| 3,407,171 | 10/1968 | Segre | 138—118 X |
| 3,413,017 | 11/1968 | Hughey | 285—354 X |

FOREIGN PATENTS 1,221,842  1/1960  France.

DAVE W. AROLA, Primary Examiner

U.S. Cl. X.R.

285—351, 354